(12) United States Patent
Wardas et al.

(10) Patent No.: US 9,921,096 B2
(45) Date of Patent: Mar. 20, 2018

(54) MECHANICAL SYSTEM FOR CENTERING AND HOLDING A COAX CONDUCTOR IN THE CENTER OF AN OUTER CONDUCTOR

(71) Applicant: Honeywell International Inc., Morristown, NJ (US)

(72) Inventors: Michael Wardas, North Vancouver (CA); Stuart James Heath, Surrey (CA)

(73) Assignee: Honeywell International Inc., Morris Plains, NJ (US)

( * ) Notice: Subject to any disclaimer, the term of this patent is extended or adjusted under 35 U.S.C. 154(b) by 592 days.

(21) Appl. No.: 14/482,252

(22) Filed: Sep. 10, 2014

(65) Prior Publication Data

US 2016/0069729 A1    Mar. 10, 2016

(51) Int. Cl.
*G01F 23/284*    (2006.01)

(52) U.S. Cl.
CPC ................... *G01F 23/284* (2013.01)

(58) Field of Classification Search
CPC .................................................. G01F 23/284
See application file for complete search history.

(56) References Cited

U.S. PATENT DOCUMENTS

| | | | | |
|---|---|---|---|---|
| 3,872,780 A | * | 3/1975 | Zanias | E04H 12/28 126/307 R |
| 3,874,237 A | * | 4/1975 | Zwarts | G01F 23/284 73/290 R |
| 4,250,927 A | * | 2/1981 | Newburg | F16L 7/00 138/113 |
| 4,258,422 A | * | 3/1981 | Dougherty | G01F 17/00 701/123 |
| 4,352,159 A | * | 9/1982 | Colby | G01F 23/263 340/618 |
| 4,355,363 A | * | 10/1982 | Colby | G01F 23/263 340/618 |
| 4,373,390 A | * | 2/1983 | van Dyke | G01F 23/263 73/304 C |
| 4,451,894 A | * | 5/1984 | Dougherty | G01F 23/263 340/612 |
| 4,615,359 A | * | 10/1986 | Affa | F16L 59/07 138/104 |
| 4,806,847 A | * | 2/1989 | Atherton | G01F 23/268 324/665 |
| 4,821,587 A | * | 4/1989 | Rogers | G01N 1/12 33/717 |
| 4,930,544 A | * | 6/1990 | Ziu | F16L 7/00 138/111 |
| 5,042,300 A | * | 8/1991 | Benjey | F01M 11/12 200/84 C |
| 5,072,625 A | * | 12/1991 | Anderson | G01F 23/0046 33/717 |

(Continued)

*Primary Examiner* — Harshad R Patel
*Assistant Examiner* — Punam Roy
(74) *Attorney, Agent, or Firm* — Richard Krukar; Kermit D. Lopez; Luis M. Ortiz

(57) ABSTRACT

A coaxial fluid level sensor can be easily assembled and maintained with a minimum of required tooling by using U-shaped spacers to center an inner rod within an outer shell. The U-shaped spacers can be snapped onto the inner rod before or as the inner rod is inserted into the outer shell. The sensor can be extended by attaching additional inner rods and outer shells end to end.

1 Claim, 3 Drawing Sheets

(56) References Cited

U.S. PATENT DOCUMENTS

| | | | | |
|---|---|---|---|---|
| 5,307,678 | A * | 5/1994 | Cost | G01F 23/268 29/25.41 |
| 5,660,565 | A * | 8/1997 | Williams | H01R 4/5033 439/425 |
| 5,850,147 | A * | 12/1998 | Stowers | G01R 1/06722 324/755.02 |
| 6,143,988 | A * | 11/2000 | Neuroth | E21B 17/1085 138/113 |
| 6,380,750 | B1 * | 4/2002 | Schenck, Jr. | G01F 23/268 324/663 |
| 6,595,051 | B1 * | 7/2003 | Chandler, Jr. | G01F 23/161 200/190 |
| 6,749,367 | B1 * | 6/2004 | Terry, III | E03F 1/002 138/113 |
| 7,005,581 | B2 * | 2/2006 | Burnette | H02G 3/0683 174/68.3 |
| 7,239,129 | B2 * | 7/2007 | Steinich | G01D 5/485 324/207.13 |
| 7,392,699 | B2 * | 7/2008 | Motzer | B08B 1/008 73/290 R |
| 7,814,789 | B2 * | 10/2010 | Schroth | G01F 23/284 73/290 V |
| 8,018,373 | B2 * | 9/2011 | Edvardsson | G01F 23/284 342/118 |
| 8,773,302 | B2 * | 7/2014 | Edvardsson | G01F 23/284 342/118 |
| 8,941,532 | B2 * | 1/2015 | Fredriksson | G01F 23/284 342/124 |
| 9,074,922 | B2 * | 7/2015 | Dayal | G01F 23/284 |
| 2002/0079010 | A1 * | 6/2002 | Marchal | F16L 9/06 138/121 |
| 2004/0027137 | A1 * | 2/2004 | Sherrard | G01F 23/284 324/644 |
| 2008/0078244 | A1 | 4/2008 | Dietmeier | |
| 2009/0211808 | A1 * | 8/2009 | Falk | H01R 13/5216 174/667 |
| 2009/0293610 | A1 * | 12/2009 | Fauveau | G01F 23/26 73/304 C |
| 2009/0302867 | A1 * | 12/2009 | Schroth | G01F 23/284 324/642 |
| 2011/0214502 | A1 * | 9/2011 | Zhang | G01F 23/2845 73/290 V |
| 2012/0245584 | A1 * | 9/2012 | Kegreiss | A61B 18/12 606/41 |
| 2013/0009803 | A1 * | 1/2013 | Edvardsson | G01F 23/284 342/124 |
| 2014/0039264 | A1 * | 2/2014 | Heiman | A61B 17/025 600/202 |
| 2014/0125512 | A1 * | 5/2014 | Janitch | G01F 23/284 342/124 |
| 2014/0191054 | A1 * | 7/2014 | Hingley | A61M 11/005 239/1 |
| 2015/0070206 | A1 * | 3/2015 | Hagglund | H01Q 1/50 342/124 |
| 2015/0123688 | A1 * | 5/2015 | Sappok | G01N 22/00 324/754.31 |
| 2017/0089747 | A1 * | 3/2017 | Pichot | G01F 23/284 |

* cited by examiner

MECHANICAL SYSTEM FOR CENTERING AND HOLDING A COAX CONDUCTOR IN THE CENTER OF AN OUTER CONDUCTOR

FIELD OF THE INVENTION

Embodiments are generally related to level sensors, coaxial probes, and guided wave radars.

BACKGROUND

Coaxial probes have been used in fluid level sensors to measure fluid levels in closed tanks, open tanks, reservoirs, and other environments. Radio frequency ("RF") electronics can be attached with the signal passing into the sensor's inner conductor while the outer conductor is connected to ground. These sensors are sometime referred to as guided wave radar level sensors or microwave level sensors. To measure a fluid level, the probe can be positioned vertically at a known height with one end immersed in a fluid. The fluid flows around and into the probe. Activating the RF electronics and reading the sensor output indicates the portion of the probe length that is immersed.

The coaxial probes have an inner rod, an outer shell, and a spacer that centers the rod within the shell. The spacers cannot be solid because solid spacers prevent the fluid from flowing up the inside of the probe between the inner rod and the outer shell. Currently used coaxial probes use specially shaped spacers such as stars or disks cut along a chord or two. Assembling coaxial probes with these specially shaped spacers requires that the spacer be slid down the length of the inner rod. Such assembly can be difficult, especially in the field. Systems and methods for more easily assembled coaxial probes are needed.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments that U-shaped spacers are snapped onto the inner rod instead of being slid into position along the rods length. The U-shaped spacers can be held in position by friction or by snapping them onto turned down sections of the inner rod. The friction holding the U-shaped spacer in position can be far greater than that in systems wherein spacers are slid along the rod. The inner rod, with spacers attached, can be slid into the outer shell until it reaches its proper position. The inner rod can be locked in position by locking the U-shaped spacers into position.

Another aspect of some embodiments is that there is a flow channel between the inner rod and a portion of the U-shaped sensor. The flow channel can be a gap along the inner circumference of the spacer. The gap also provides a location where the U-shaped spacer can flex as it is snapped onto the inner rod.

Different embodiments can employ any of a number of ways to lock the U-shaped spacer in place within the outer shell. Fasteners such as pins, nails, staples, or screws can be driven through the outer shell and into the spacer. Note that such fasteners must be of a size or material as to not impact the fluid level measurements. Indentations or crimps in the outer shell can also lock the U-shaped spacer in place. Another way to lock the U-shaped spacer in place is to press a hinged cutout into the spacer. A hinged cutout can be pulled back out for disassembly of the probe.

The spacers must be nonconductive and substantially impervious to whatever fluid is being measured. PTFE is a good choice although some applications require more exotic materials like PEEK.

The inner rod and the outer shell must also be substantially impervious to whatever fluid is being measured. Stainless steel is often a good choice. Particularly harsh conditions may require a more exotic alloy such as a superalloy or a material similar to Monel. Monel alloys are certain nickel alloys having at least 62% nickel and 27% copper. Examples of superalloys are Hastelloy, Inconel (e.g., IN100, IN600, IN713), Waspaloy, Rene alloys (e.g., Rene 41, Rene 80, Rene 95, Rene N5), Haynes alloys, Incoloy, MP98T, TMS alloys, and CMSX (e.g., CMSX-4) single crystal alloys.

Some embodiments enhance fluid flow into the probe by having holes or perforations in the outer shell.

Further aspects of certain embodiments have threaded or flanged ends on the inner rod and the outer shell so that additional lengths of inner rod and outer shell can be attached end to end to produce a long probe from shorter parts. The U-shaped spacers can be snapped onto the inner rod lengths at any time during assembly up to the time when the outer shell blocks the spacer from being snapped on.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

Figure 1:
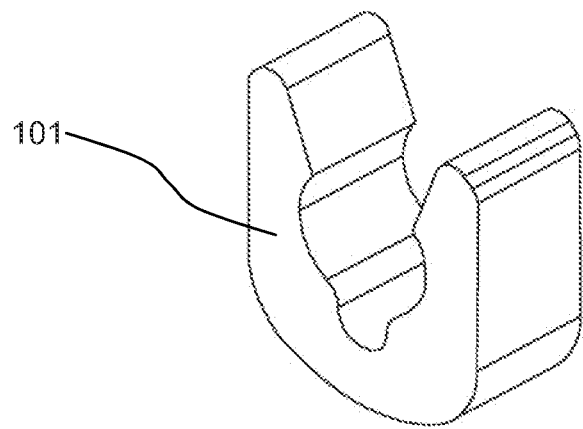
FIG. 1 illustrates a U-shaped spacer in accordance with aspects of the embodiments.
Figure 2:
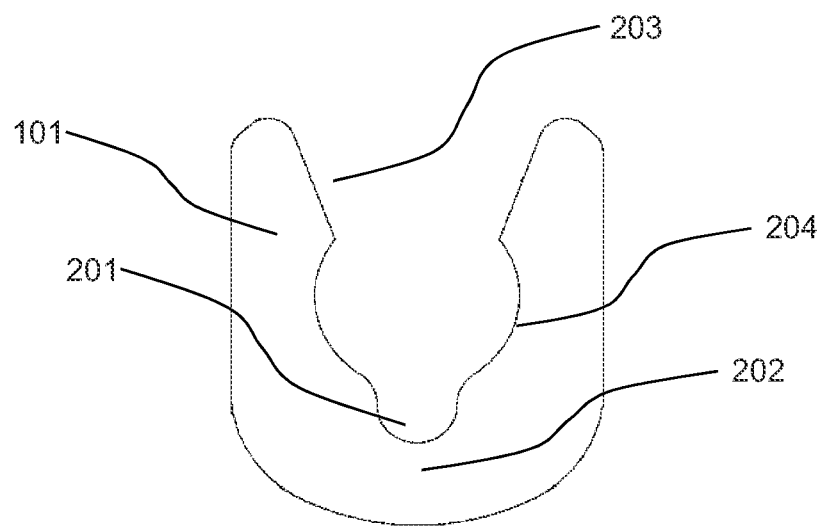
FIG. 2 illustrates a front view of a U-shaped spacer in accordance with aspects of the embodiments.

FIGS. 1 and 2 illustrate a U-shaped spacer 101 in accordance with aspects of the embodiments. The spacer is substantially U-shaped such that an inner rod can be pressed into the spacer opening 203 and into the body center 204. The spacer opening's sloped sidewalls cause the spacer 101 to spread open when the spacer opening 203 is placed on an inner rod and the spacer 101 then pressed, or snapped, onto the inner rod. An inner flow channel 201 along the inner circumference 204 of the spacer 101 can also help establish a flex zone 202 where the spacer 101 primarily flexes.

Figure 3:
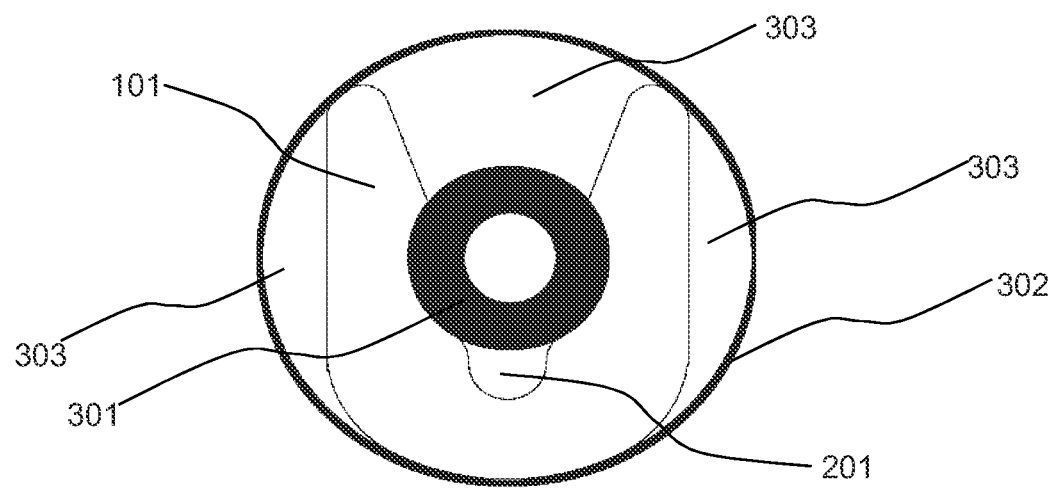
FIG. 3 illustrates a front view of a U-shaped spacer attached to an inner rod and held by an outer shell in accordance with aspects of the embodiments.

FIG. 3 illustrates a front view of a U-shaped spacer 101 attached to an inner rod 301 and held by an outer shell 302 in accordance with aspects of the embodiments. The inner flow channel 201 is now established as a volume between the inner rod and the U-shaped spacer 101. Additional flow channels 303 are also established between the outer shell and the U-shaped spacer 101 or inner rod 301.

Figure 4:
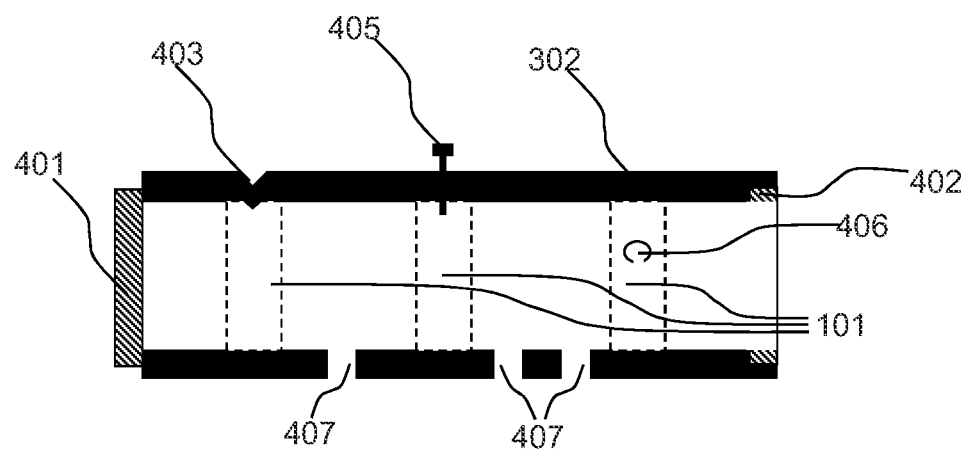
FIG. 4 illustrates a threaded outer shell containing U-shaped spacers in accordance with aspects of the embodiments.

FIG. 4 illustrates a threaded outer shell 302 containing U-shaped spacers 101 in accordance with aspects of the embodiments. FIG. 4 does not, however, show an inner rod which, in practice, must be present. The inner rod is omitted only for clarity in illustrating certain aspects of various embodiments. The outer shell 302 has threaded ends 401, 402 so that outer shells can be joined end to end. The outer shell is illustrated as having openings or perforations 407 to allow fluid to flow through the coaxial probe. The spacers 101 can be held in place by fasteners 405, clam-shaped impingements 406, or crimps/indentations 403.

Figure 5:
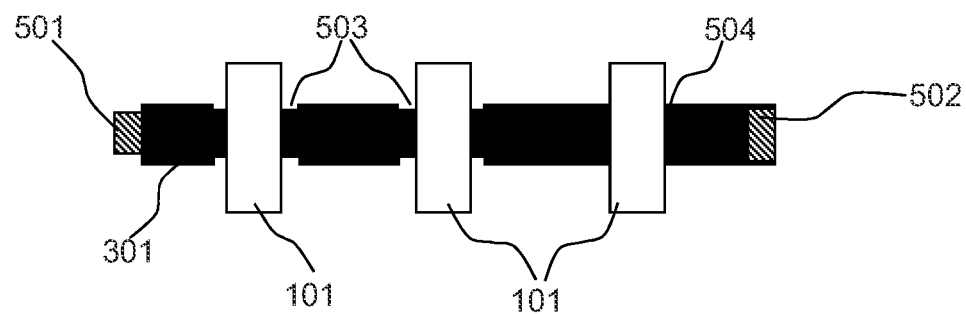
FIG. 5 illustrates U-shaped spacers attached to an inner rod in accordance with aspects of the embodiments.

FIG. 5 illustrates U-shaped spacers 101 attached to an inner rod 301 in accordance with aspects of the embodiments. The inner rod is illustrated as having threaded ends 501, 502 such that inner rods can be joined end-to-end. Two of the spacers 101 have been snapped onto stepped down zones 503 of the inner rod. Those two spacers are prevented from moving off the stepped down zones 503 because the stepped down zones 503 have a smaller diameter than the inner rod in general. Friction may hold the spacers in position within the stepped down zones. A third U-shaped spacer is simply snapped onto the rod at an unprepared spot 504 where the diameter of the inner rod has not been reduced. The third spacer holds its place by friction alone.

Figure 6:
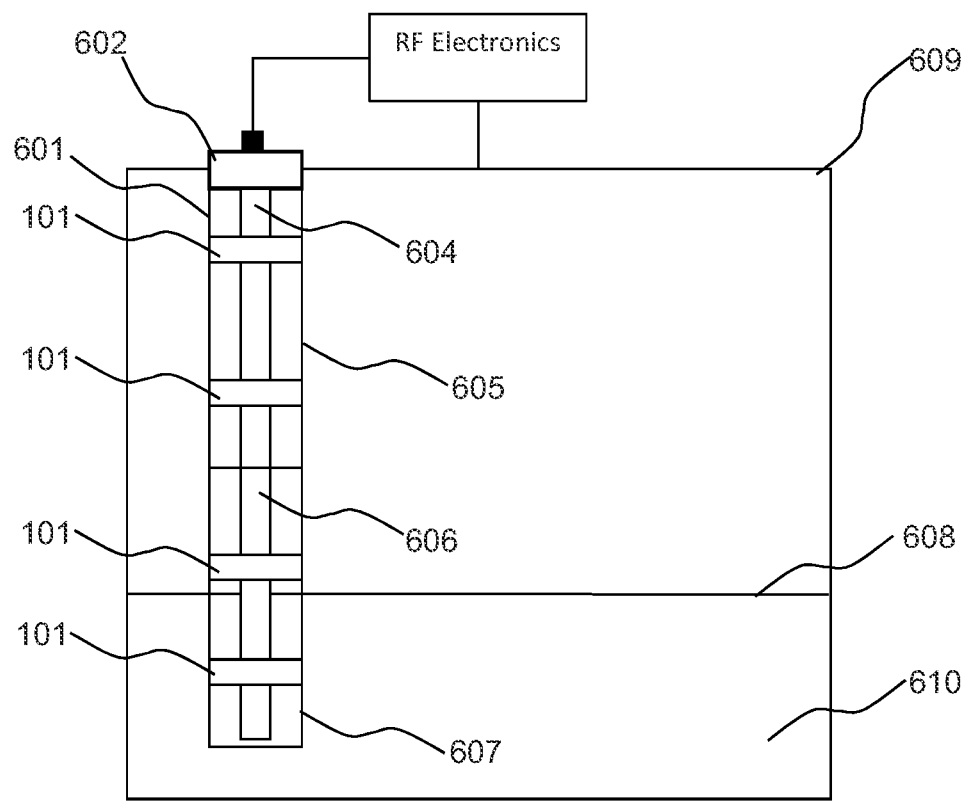
FIG. 6 illustrates a coaxial probe with U-shaped spacers installed on a fully enclosed tank containing a fluid.

FIG. 6 illustrates a coaxial probe 601 with U-shaped spacers 101 installed on a fully enclosed tank 609 containing a fluid 610. An end cap 602 is attached to the tank 609 and holds the inner rod 604 and outer shell 605. In the illustrated installation, the tank 609 itself provides electrical ground and thereby also grounds the outer shell 605 by way of the end cap 602. The end cap 602 also holds the inner rod 604 in isolation from electrical ground. The inner rod 604 is attached to RF electronics that provide electrical signals to the coaxial probe 601. The RF electronics can provide a measurement of the fluid level 608 or can be connected to additional equipment that provides the measurement.

The coaxial probe 601 of FIG. 6 has U-shaped spacers 101 keeping the inner rod 604 centered in the outer shell 605. The illustrated coaxial probe has also been extended by attaching an additional inner rod 606 end-to-end with the inner rod 604 and by attaching an additional outer shell 607 end-to-end with the outer shell 605. Note that the elongated inner rod and the elongated outer shell are not quite the same length. In general, the inner rods and outer shells can be of different lengths as a coaxial probe is assembled. For example, three inner rods of four foot length can be combined with four outer shells of three foot length to produce a twelve foot coaxial probe. U-shaped spacers make such assemblies easy because they can be snapped on instead of pushed down the length of the inner rod or the coaxial probe.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A coaxial probe comprising:
an inner rod;
a plurality of U-shaped spacers frictionally clamped onto the inner rod;
an outer shell circumferentially enclosing the inner rod;
a plurality of crimpings in the outer shell and positioned over the U-shaped spacers to thereby lock the U-shaped spacers in place, wherein the inner rod and the outer shell are stainless steel, wherein the U-shaped spacers are PTFE spacers, wherein the outer shell comprises a plurality of perforations through which a fluid can flow;
an additional inner rod attached end-to-end with the inner rod, an additional outer shell attached end-to-end with the outer shell, and additional U-shaped spacers frictionally clamped onto the additional inner rod, and wherein the additional outer shell circumferentially encloses the additional inner rod, wherein the inner rod, outer shell, additional inner rod, and additional outer shell comprise threaded ends wherein the threaded ends attach the inner rod to the additional inner rod and attach the outer shell to the additional outer shell;
a plurality of fasteners passing through the outer shell and into at least one of the additional U-shaped spacers;
a plurality of outer shell deformations positioned over the U-shaped spacers;
wherein the additional inner rod is an alloy comprising at least 62% nickel and 27% copper;
wherein the additional outer shell is a superalloy;
wherein the additional U-shaped spacers are PEEK;
wherein the inner rod has a body diameter and comprises a plurality of stepped down zones having a stepped diameter smaller than the body diameter;
wherein the plurality of U-shaped spacers are frictionally attached to the stepped down zones; and
wherein the U-shaped spacers are further restricted to the stepped down zones because the body diameter is greater than the stepped diameter.

* * * * *